United States Patent [19]

Kazaoka et al.

[11] Patent Number: 4,740,035
[45] Date of Patent: Apr. 26, 1988

[54] UPHOLSTERED SEAT FOR AUTOMOBILES

[75] Inventors: Kenichi Kazaoka, Nagoya; Yasuhisa Inaba, Handa; Fumio Wakamatsu, Okazaki, all of Japan

[73] Assignee: Aisin Seiki Kabushiki Kaisha, Tokyo, Japan

[21] Appl. No.: 912,503

[22] Filed: Sep. 29, 1986

[30] Foreign Application Priority Data

Sep. 30, 1985 [JP] Japan .................................. 60-216979
Sep. 30, 1985 [JP] Japan .................................. 60-216982

[51] Int. Cl.$^4$ ............................................ A47C 27/00
[52] U.S. Cl. ..................................... 297/452; 297/218; 297/219
[58] Field of Search ................. 297/452, 460, 218, 219

[56] References Cited

U.S. PATENT DOCUMENTS

| | | | |
|---|---|---|---|
| 2,575,548 | 11/1951 | Carter et al. | 297/219 |
| 3,844,614 | 10/1974 | Babbs | 297/452 |
| 4,019,776 | 4/1977 | Takamatsu | 297/218 X |
| 4,047,756 | 9/1977 | Ney | 297/219 |
| 4,530,541 | 7/1985 | Resag et al. | 297/452 |
| 4,580,837 | 4/1986 | Bayley | 297/452 X |
| 4,601,517 | 7/1986 | Heesch | 297/452 |
| 4,627,664 | 12/1986 | Okazaki et al. | 297/452 |
| 4,636,006 | 1/1987 | Kazaoka et al. | 297/458 |

FOREIGN PATENT DOCUMENTS 3136651  3/1983  Fed. Rep. of Germany ...... 297/452

*Primary Examiner*—James T. McCall
*Attorney, Agent, or Firm*—Finnegan, Henderson, Farabow, Garrett & Dunner

[57] ABSTRACT

An upholstered seat for use in an automobile includes a seat cushion, seat adjusters mounted on the seat cushion and each composed of a slidable lower bracket and an upper bracket angularly movably mounted on the lower bracket, and a seat back fixedly mounted on the upper brackets and including a seat back frame and a cover having side gores fastened to the seat back frame in front of the upper brackets. The side gores can be fastened to the seat back frame before the upper brackets are secured to the seat back. Therefore, the side gores are kept uniformly taut without sagging while the upper brackets are being fastened to the seat back.

6 Claims, 9 Drawing Sheets

UPHOLSTERED SEAT FOR AUTOMOBILES

BACKGROUND OF THE INVENTION

1. Field of the Invention:

The present invention relates to an upholstered seat for use in an automobile.

2. Description of the Prior Art:

Upholstered seats for use in automobiles generally comprise a seat cushion, a seat back, and a seat adjuster. One conventional design of such an upholstered seat is illustrated in FIGS. 9 and 10 of the accompanying drawings. The upholstered seat, generally indicated by the reference numeral 1, includes a seat cushion 2 comprising springs (not shown) supported under tension on a seat cushion frame 3, a cushion padding 4, and a cover 5 covering springs, the seat cushion frame 3, and the cushion padding 4. The seat 1 also includes a seat back 6 comprising a seat back frame 7, springs supported under tension on the seat back frame 7, a cushion padding 8, and a cover 9 covering the seat back frame 7, the springs, and the cushion padding 8. The seat back 6 also has a lumbar support 10. The seat 1 further includes a seat adjuster 11 composed of a pair of parallel lower rails 12 to be fixed to the floor of an automobile body, a pair of upper rails 13 slidably fitted over the lower rails 12, respectively, a pair of lower brackets 14 secured to the upper rails 13, respectively, and a pair of upper brackets 15 angularly movably mounted on the lower brackets 14, respectively. The frame 3 of the seat cushion 2 is fixed by bolts 18 to the lower brackets 14. The brackets 15 are fastened by bolts 17 to plates 19 welded to the frame 7 of the seat back 6 at opposite sides thereof.

To assemble the upholstered seat 1, the cover 5 is placed under tension over the cushion padding 4 of the seat cushion 2, and peripheral edges of the cover 5 are secured to clips fixed to lower edges of the cushion frame 3. Then, the seat cushion 2 is fixed by the bolts 18 to the lower brackets 14. The cover 9 is held under tension against the cushion padding 8, and its edges except side gores 9a over the upper brackets 15 are secured by clips 20 to the seat back frame 7. With the unfastened side gores 9a being turned over as shown in FIG. 9, the upper brackets 15 are fastened by the bolts 17 to the plates 19 of the seat back frame 7. Thereafter, the side gores 9a are brought over the upper brackets 15 and back onto the rear of the seat back 6 and fastened by clips 20 to the seat back frame 7. In this manner, the seat back 6 is fixed to the upper bracket 15 and the cover 9 is kept taut over the cushion padding 8 and the seat back frame 7.

As shown in FIGS. 9 and 10, the upholstered seat thus assembled is poor in appearance since the seat adjusters 11 are exposed to external view beneath the sides of the seat cushion 2. Particularly, the exposed seat adjusters 11, which are made of metal, do not match the covers 5, 9 that are usually in the form of high-quality woven cloth. The side gores 9a are apt to be put under a different tension than the other portion of the cover 9.

One solution would be to apply covers having a color similar to that of the covers 5, 9 to the seat adjusters 11 to cover them. However, use of such covers would not be practical since they would rub against the covers 5, 9 and damage them.

According to another solution, the seat adjusters 11 could be accommodated in the seat cushion 2 and the cover 5 could be fastened to lower edges of the lower brackets 14. However, this arrangement would be disadvantageous in that while the seat adjusters 11 would be concealed by the cover 5, the side gores 9a and the other portion of the cover 9 would still tend to be differently tensioned.

SUMMARY OF THE INVENTION

It is an object of the present invention to provide an upholstered seat for use in automobiles which has a seat back cover tensioned uniformly in its entirety.

Another object of the present invention is to provide an upholstered seat for use in automobiles which has an improved appearance with seat adjusters accommodated in a seat cushion.

According to the present invention, there is provided an upholstered seat for use in an automobile which includes a seat cushion, seat adjusters mounted on the seat cushion and each composed of a slidable lower bracket and an upper bracket angularly movably mounted on the lower bracket, and a seat back fixedly mounted on the upper brackets and including a seat back frame and a cover having side gores fastened to the seat back frame in front of the upper brackets. The side gores can be fastened to the seat back frame before the upper brackets are secured to the seat back. Therefore, the side gores are kept uniformly taut without sagging while the upper brackets are being fastened to the seat back. Rear cover portions extend rearwardly from the side gores in covering relation to the upper brackets, thus finishing the sides of the seat back in an aesthetically appealing fashion. The upper brackets are received respectively in recesses defined in the sides of a seat back frame, the recesses being effective in reinforcing the seat back frame.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
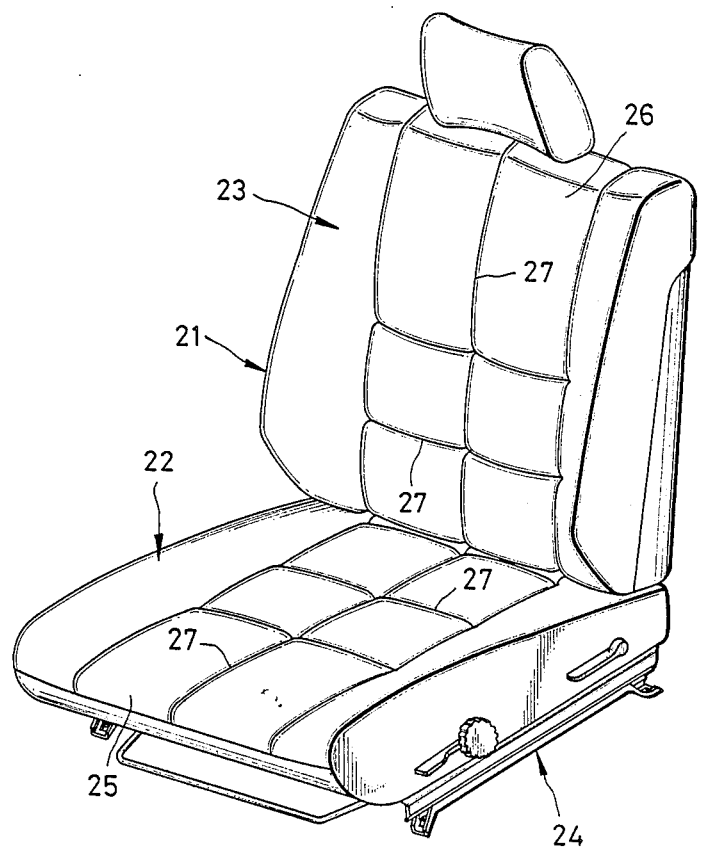
FIG. 1 is a perspective view of an upholstered seat according to the present invention.

As shown in FIG. 1, an upholstered seat 21 according to the present invention, for use in an automobile, generally comprises a seat cushion 22, a seat back 23, and seat adjusters 24 disposed on both sides of the seat cushion 22. The seat cushion 22 and the seat back 23 have respective covers 25, 27 which are kept taut by pleats 27.

Figure 2:
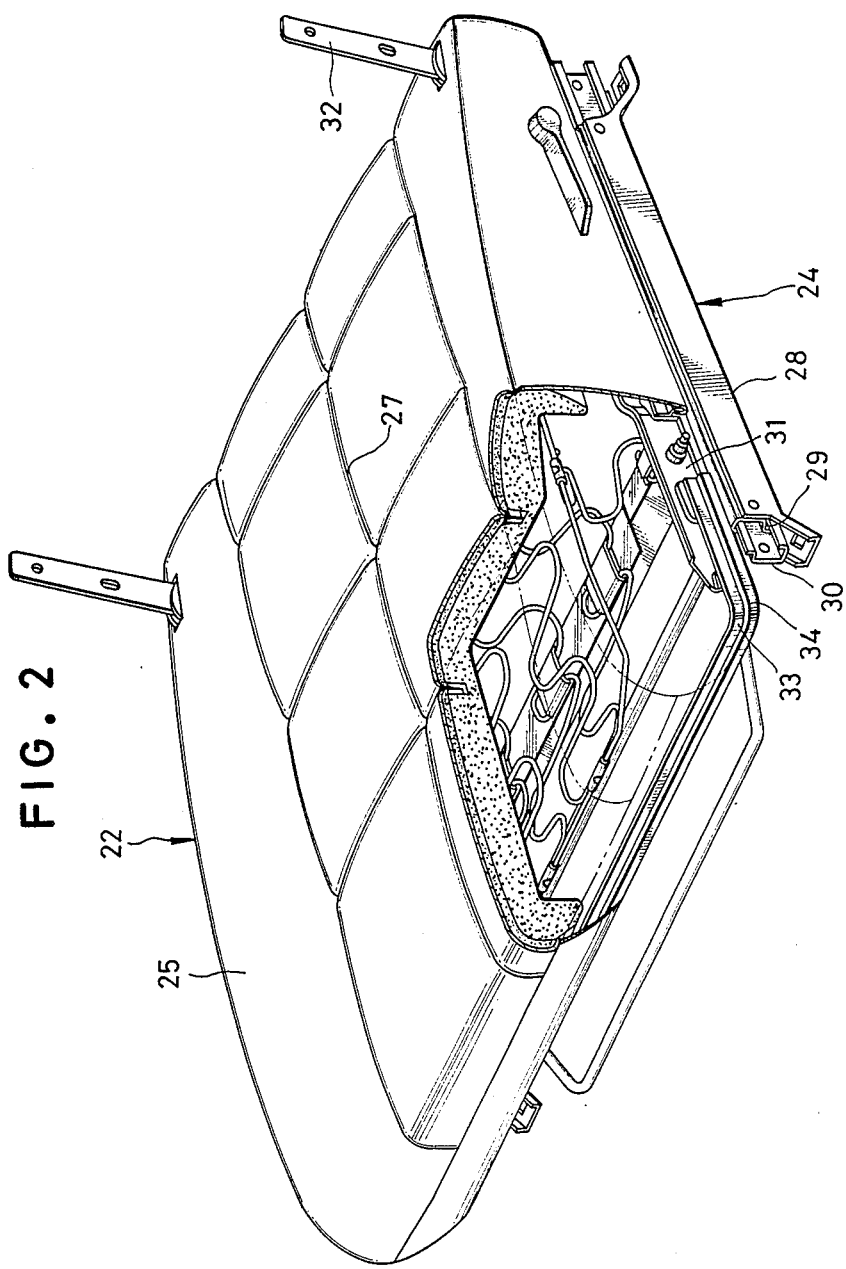
FIG. 2 is a perspective view, partly cut away, of a seat cushion of the upholstered seat shown in FIG. 1.

In FIG. 2, each of the seat adjusters 24 is composed of a lower rail 29 having a bracket 28 secured to the floor of a vehicle body, an upper rail 30 slidably fitted in the lower rail 29, a lower bracket 31 fixed to the upper rail 30, and an upper bracket 32 angularly movably coupled to the lower bracket 31. The seat cushion 22 has a seat cushion frame 33 fixed to the lower brackets 31 of the seat adjusters 24. After the seat cushion 22 has been secured to the lower brackets 31, edges of the cover 25 are anchored to an L-shaped plate 34 directed downwardly and mounted on the seat cushion frame 33. Thus, the lower brackets 31 are positioned within and concealed by the cover 25.

Figure 3:
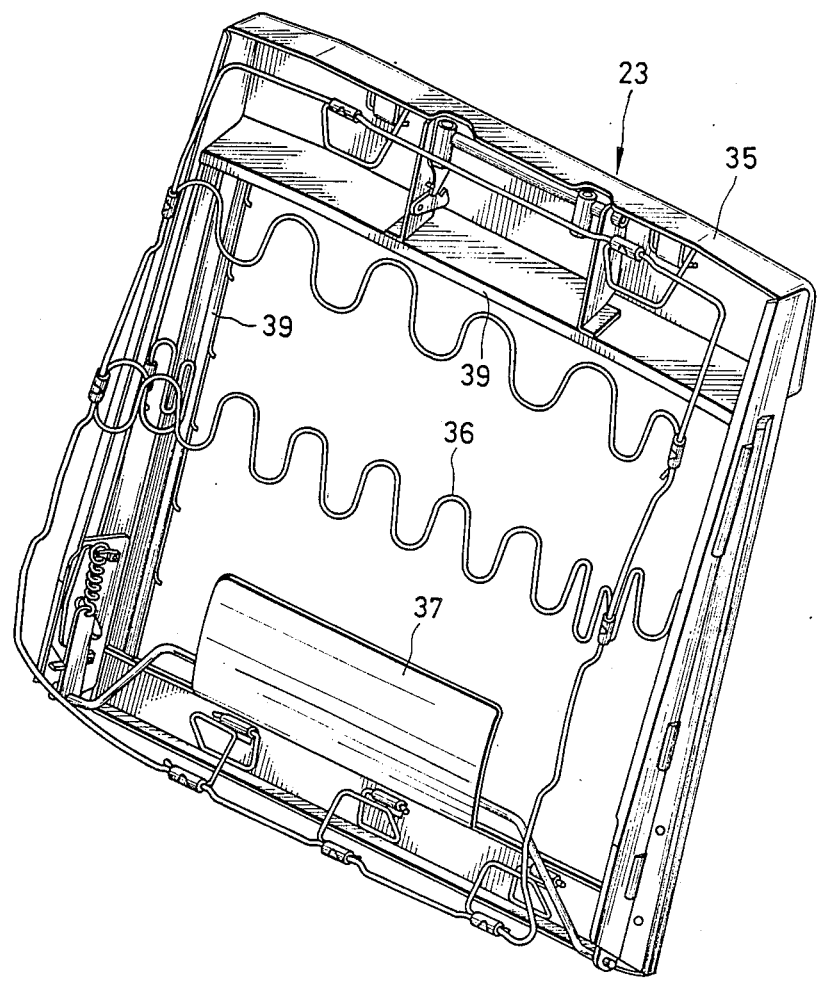
FIG. 3 is a perspective view of a seat back frame of the upholstered seat of FIG. 1.
Figure 4:
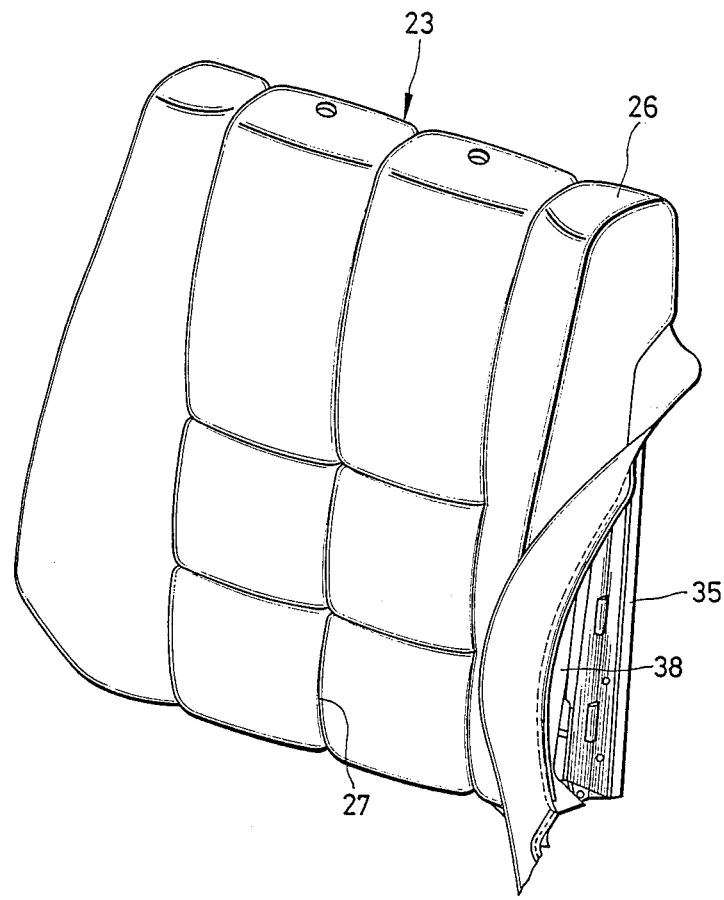
FIG. 4 is a perspective view of a seat back of the upholstered seat of FIG. 1.

As illustrated in FIGS. 3 and 4, the seat back 23 includes a seat back frame 35 on which springs 36, a lumbar support 37, and a cushion padding 38 are supported. The cover 26 of the seat back 23 is tensioned by engagement with plates 39 mounted on the frame 35. Side gores 26a of the cover 26 are fastened by clips 40 (FIG. 5) to the seat back frame 35 in front of the upper brackets 32.

Figure 5:
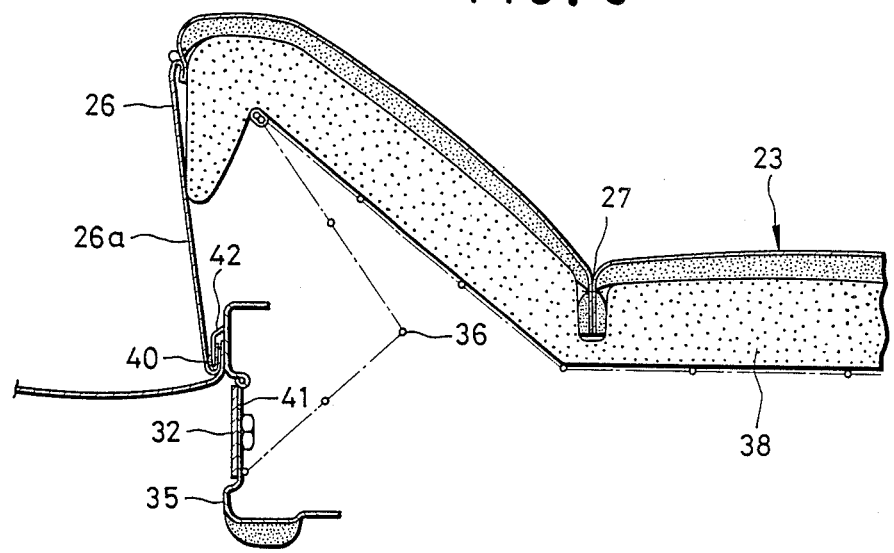
FIG. 5 is an enlarged fragmentary cross-sectional view showing the relationship between the seat back frame and a seat back cover to be attached.
Figure 7:
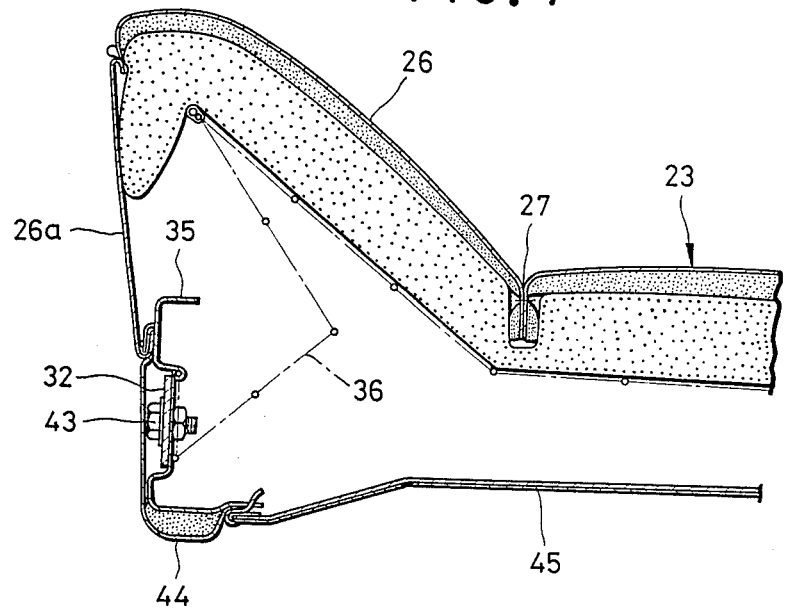
FIG. 7 is an enlarged fragmentary cross-sectional view of the seat back frame covered with the seat back cover.
Figure 6:
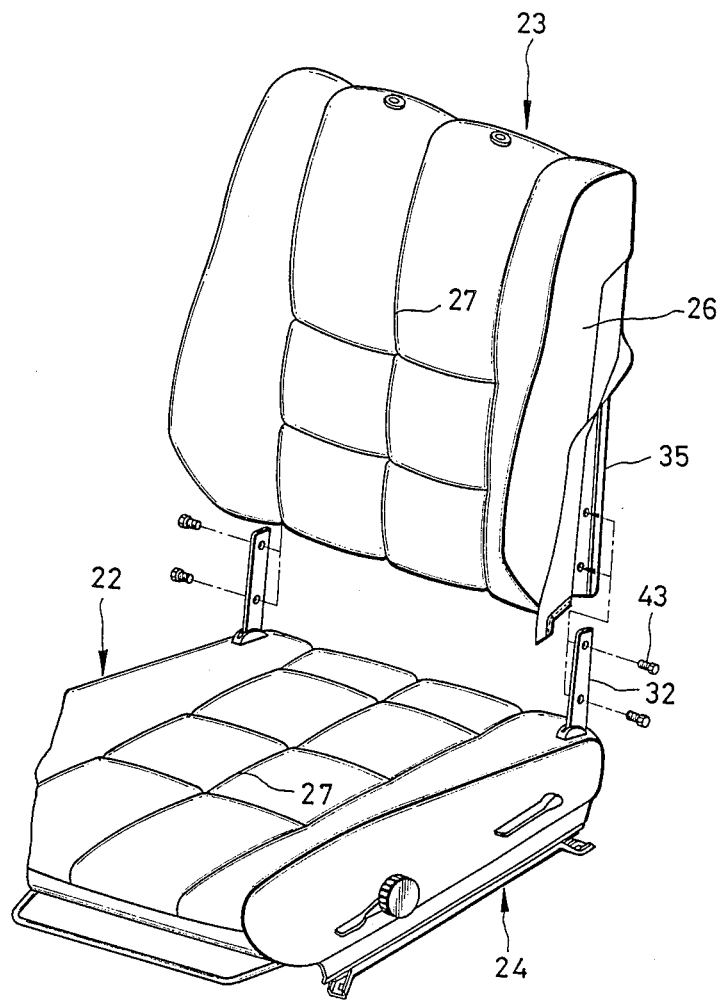
FIG. 6 is an exploded perspective view showing the manner in which the upholstered seat of the invention is assembled.

For assembly, as shown in FIG. 5, each side of the seat back frame 35 has a recess 41 receiving one of the upper brackets 35 therein and hooks 42 positioned in front of the recess 41, the hooks 42 being formed by lancing, for example. The clips 40 are sewn to the side gores 26a in positional alignment with the hooks 42. After the cover 26 is tensioned by the pleats 27, the clips 40 are brought into engagement with the hooks 42 to keep the entire cover 26 taut. Then, as shown in FIG. 6, the seat back frame 35 is fixed by bolts 43 to the upper brackets 32. Thereafter, the sides of the frame 35 are covered with rear portions 44 of the cover 26 which extend rearwardly from the side gores 26a, as shown in FIG. 7, and rear edges of the rear portions 44 are fastened to rear edges of the seat back frame 35. The rear of the seat back 23 is thereafter covered with a cover 45.

Since the side gores 26a can be fastened to the seat back frame 35 before the upper brackets 32 are secured to the seat back frame 35, the side gores 26a are kept uniformly taut and do not sag while the upper brackets 32 are being fastened to the seat back frame 35. The rear cover portions 44 extending rearwardly from the side gores 26a cover the upper brackets 32, thus finishing the sides of the seat back 23 in an aesthetically appealing fashion. The recesses 41 which receive the upper brackets 32 are effective in reinforcing the seat back frame 35.

Figure 8:
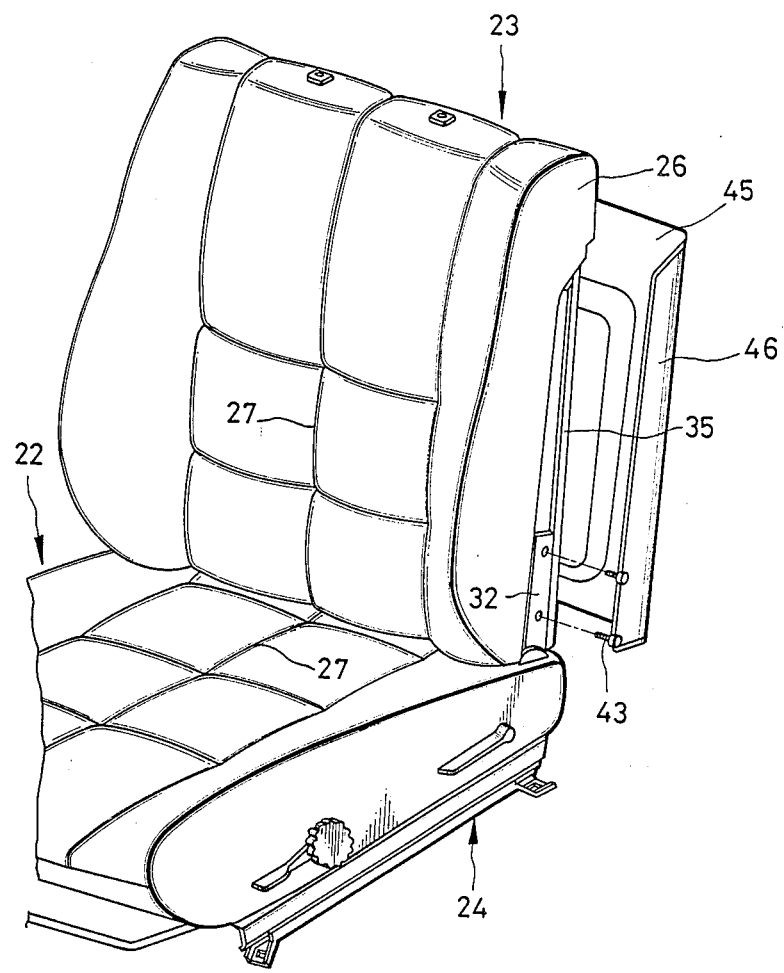
FIG. 8 is a fragmentary perspective view of an upholstered seat, showing another arrangement for covering a seat back frame thereof.
Figure 9:
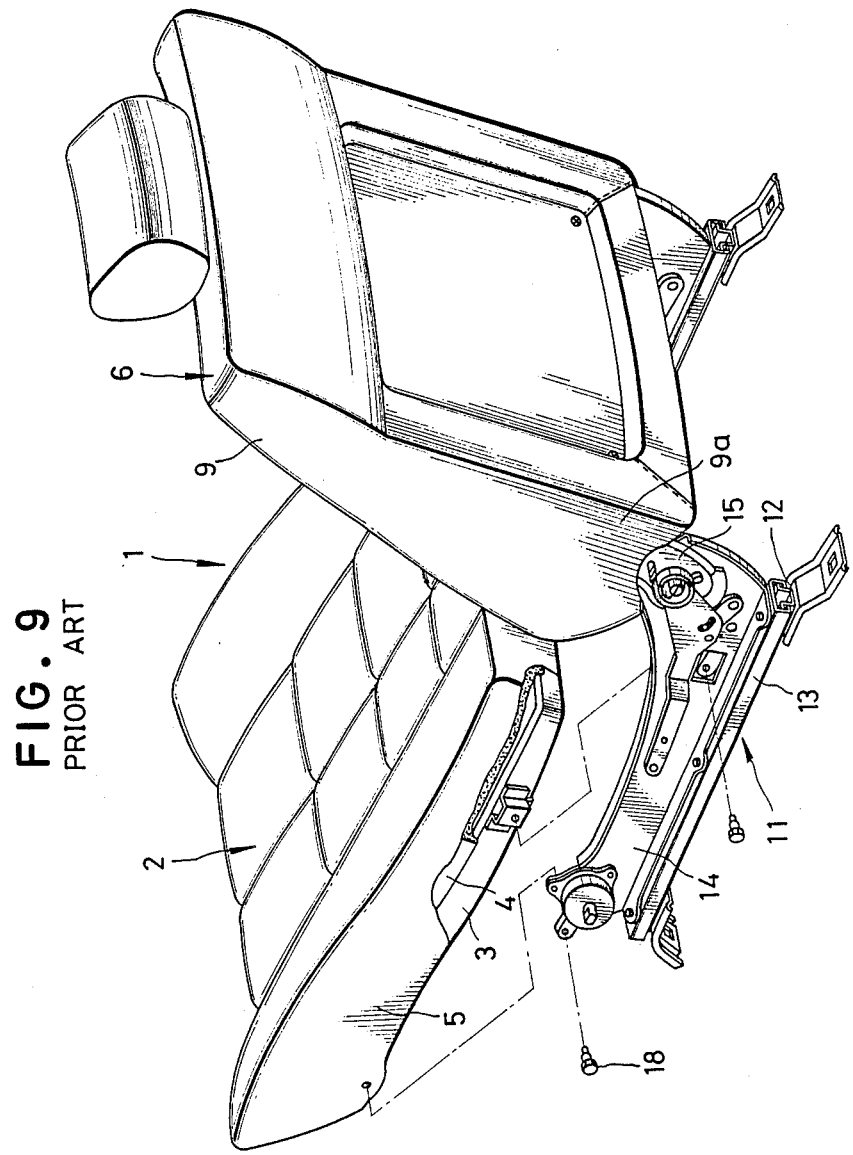
FIG. 9 is an exploded perspectivew view, partly broken away, of a conventional upholstered seat.
Figure 10:
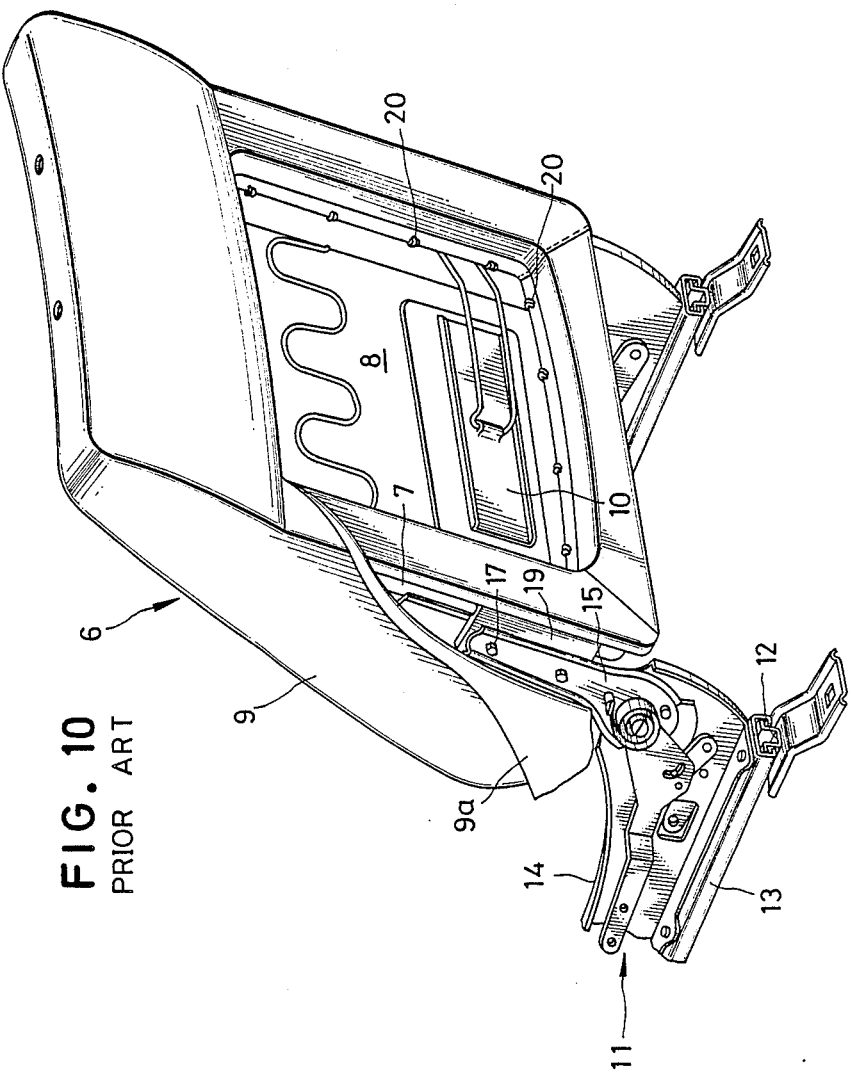
FIG. 10 is a fragmentary perspective view showing the rear of a seat back of the conventional upholstered seat shown in FIG. 9.

FIG. 8 shows a modification in which the cover 45 has forwardly directed sides 46 shaped to cover the sides of the seat back frame 35 to which the upper brackets 32 are secured. In this modification, the cover 26 does not require rear portions for covering the sides of the seat back frame 35.

Although certain preferred embodiments have been shown and described, it should be understood that many changes and modifications may be made therein without departing from the scope of the appended claims.

What is claimed is:

1. An upholstered seat for use in an automobile, comprising:
   a seat cushion;
   seat adjusters mounted on said seat cushion each having a slidable lower bracket and an upper bracket pivotally mounted on said lower bracket; and
   a seat back including a seat back frame and first cover means including a primary cover portion, said seat back frame having a first frame portion disposed at opposite sides of said seat back frame for fixedly receiving said primary cover portion such that said primary cover portion substantially covers a frontal portion of said seat back frame and said first frame portion and said seat back frame having a second frame portion disposed at said opposite sides and adapted for fixedly receiving said upper bracket for pivotal movement therewith, said second frame portion being uncovered by said primary cover portion.

2. The seat of claim 1, wherein said primary cover portion includes side gores having clips attached thereto, said clips being adapted for attachment to said first frame portion.

3. The seat of claim 2, wherein said first frame portion includes hooks for fixedly receiving said clips.

4. The seat of claim 3, wherein said first cover means includes a secondary cover portion extending from said side gores of said primary cover portion for covering said second frame portion and said upper bracket, said secondary cover portion being attachable to a rear portion of said seat back frame.

5. The seat of claim 1, wherein said seat further includes second cover means disposed on a rear portion of said seat back frame for substantially covering said rear portion of said seat back frame.

6. The seat of claim 5, wherein said second cover means includes side portions extending from said rear portion of said seat back frame toward said frontal portion of said seat back frame to cover said second frame portion.

* * * * *

UNITED STATES PATENT AND TRADEMARK OFFICE
CERTIFICATE OF CORRECTION

PATENT NO. : 4,740,035

DATED : April 26, 1988

INVENTOR(S) : KAZAOKA et al.

It is certified that error appears in the above-identified patent and that said Letters Patent is hereby corrected as shown below:

Title page, under "Assignee:"

Please change "Tokyo, Japan" to --Kariya, Japan--.

Signed and Sealed this

Twenty-ninth Day of November, 1988

Attest:

DONALD J. QUIGG

*Attesting Officer*    *Commissioner of Patents and Trademarks*